Patented July 31, 1923.

1,463,403

UNITED STATES PATENT OFFICE.

BIRTRUN L. PICKARD, OF LOS ANGELES, CALIFORNIA.

ADHESIVE PASTE.

No Drawing.   Application filed August 29, 1922. Serial No. 585,057.

*To all whom it may concern:*

Be it known that I, BIRTRUN L. PICKARD, a citizen of the United States, residing at Los Angeles, in the county of Los Angeles and State of California, have invented new and useful Improvements in Adhesive Pastes, of which the following is a specification.

My invention relates to a composition of matter embodying such ingredients as to form an adhesive substance possessing properties that make sure the firm union of two or more plies or thicknesses of wood, textile fabrics, leather, woven fabrics or any other materials.

This composition consists of the following ingredients in about the proportions stated, to wit: First, to two gallons of cactus liquid add one pound of ground glue and boil for about thirty minutes; second, mix with this product while boiling a heavy paste of one pound of corn starch; third, mix with this product while at a boiling heat, one quart of orange shellac and add about one pound of powdered alum.

Adding glue to the cactus liquid gives hardness. Adding corn starch also tends to harden and increase drying quality of the product. The shellac and alum also tend to render the resulting product damp proof and hasten the drying quality thereof. The alum also hastens and tends to waterproof the product. The ingredients may be placed in a vessel for commingling by agitation or otherwise. It has been found that agitation in the presence of heat improves the composition.

One manner of applying my improved adhesive substance is to apply the same while in heated or cold condition to the plies of wood or other material, the composition being applied preferably, although not necessarily to two adjacent sides of the material and both pieces pressed to form one piece of material before the substance dries.

The cactus liquid may be derived from the spineless variety or the variety having spines. In practice I have found the liquid derived from the spineless variety to be particularly adapted for use in my improved composition.

Having described my invention what I claim as new and desire to secure by Letters Patent is:

The herein described composition of matter, consisting of cactus liquid, glue, corn starch, shellac and alum, said cactus liquid being present in prepondering proportion over each remaining element.

In witness whereof I have signed my name to this specification.

BIRTRUN L. PICKARD.